(12) United States Patent
Mubarak et al.

(10) Patent No.: US 12,215,722 B2
(45) Date of Patent: Feb. 4, 2025

(54) EMERGENCY ISOLATION VALVE CONTROL DESIGN

(71) Applicant: SAUDI ARABIAN OIL COMPANY, Dhahran (SA)

(72) Inventors: Yousef H. Mubarak, Alhassa (SA); Manoj Chetia, Udhailiyah (SA); Elmer S. Castillo, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 15 days.

(21) Appl. No.: 18/191,106

(22) Filed: Mar. 28, 2023

(65) Prior Publication Data

US 2024/0328536 A1    Oct. 3, 2024

(51) Int. Cl.
*F15B 19/00* (2006.01)
*F16K 31/04* (2006.01)
*F16K 31/122* (2006.01)
(Continued)

(52) U.S. Cl.
CPC .......... *F15B 19/005* (2013.01); *F16K 31/041* (2013.01); *F16K 31/122* (2013.01);
(Continued)

(58) Field of Classification Search
CPC ................ F16K 31/163; F16K 31/122; F16K 31/1221; F16K 31/56; F16K 31/12; F16K 31/1225; F16K 31/1262; F16K 31/041; F16K 31/124; F16K 31/14; F16K 31/143; F16K 31/423; F16K 37/0083; F16K 37/0091; F15B 19/005; F15B 2211/855; F15B 2211/8752; F15B 2211/8755

See application file for complete search history.

(56) References Cited

U.S. PATENT DOCUMENTS 4,635,674 A * 1/1987 Bajka ................. F16K 11/0853
137/246.22
2002/0108436 A1    8/2002 Albuaijan
(Continued)

FOREIGN PATENT DOCUMENTS

EP         3565975 B1      11/2022
JP         H0738702 U  *    7/1995
KR       100489585 B1  *    5/2005

OTHER PUBLICATIONS

Akira.*

(Continued)

*Primary Examiner* — Atif H Chaudry
(74) *Attorney, Agent, or Firm* — Osha Bergman Watanabe & Burton LLP

(57) ABSTRACT

A control system includes a pneumatic actuator having a spring that is compressible by a gas and connected to the isolation valve, wherein the gas is supplied to the pneumatic actuator along a gas flow path, a solenoid valve operable between an open position and a closed position, wherein the open position permits the gas to flow along the gas flow path to the pneumatic actuator, a partial stroke test device configured to perform partial stroking of the isolation valve upon reception of a signal from a computer by sending the gas to the pneumatic actuator through a needle valve, and a universal operation hand operated valve configured to send the gas to the solenoid valve or to the partial stroke test device.

19 Claims, 4 Drawing Sheets

(51) Int. Cl.
- *F16K 31/124* (2006.01)
- *F16K 31/126* (2006.01)
- *F16K 31/143* (2006.01)
- *F16K 31/163* (2006.01)
- *F16K 31/42* (2006.01)
- *F16K 31/56* (2006.01)
- *F16K 37/00* (2006.01)

(52) U.S. Cl.
CPC ...... *F16K 31/1221* (2013.01); *F16K 31/1225* (2013.01); *F16K 31/124* (2013.01); *F16K 31/1262* (2013.01); *F16K 31/143* (2013.01); *F16K 31/163* (2013.01); *F16K 31/423* (2013.01); *F16K 31/56* (2013.01); *F16K 37/0083* (2013.01); *F16K 37/0091* (2013.01); *F15B 2211/855* (2013.01); *F15B 2211/8752* (2013.01); *F15B 2211/8755* (2013.01)

(56) References Cited

U.S. PATENT DOCUMENTS

2012/0216898 A1* 8/2012 Carter ................... F15B 20/008
                                                          137/861
2017/0184215 A1* 6/2017 Junk ....................... F15B 20/00

OTHER PUBLICATIONS

Choi.*
International Search Report issued for corresponding international patent application No. PCT/US2024/021727, mailed Jul. 4, 2024 (5 pages).
Written Opinion issued for corresponding international patent application No. PCT/US2024/021727, mailed Jul. 4, 2024 (13 pages).

* cited by examiner

EMERGENCY ISOLATION VALVE CONTROL DESIGN

BACKGROUND

Emergency isolation valves are safety valves that are used to shut off flow of a fluid in an emergency. When fluids are combustible or otherwise dangerous to people and the environment, control of the fluids is important. If an emergency were to occur, such as a fire, an earthquake, a leak, etc., it is important that the flow of fluid can be contained or stopped. Emergency isolation valves are designed to naturally reside in a closed position and require an energy source to open and keep the valve open. Thus, when an emergency or abnormal process condition occurs, and the energy source is cut off by automatic or manual control, the isolation valve is able to close and shut off the flow of the fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for a control system for an isolation valve. The control system includes a pneumatic actuator having a spring that is compressible by a gas and connected to the isolation valve, wherein the gas is supplied to the pneumatic actuator along a gas flow path, a solenoid valve operable between an open position and a closed position, wherein the open position permits the gas to flow along the gas flow path to the pneumatic actuator, a partial stroke test device configured to perform partial stroking of the isolation valve upon reception of a signal from a computer by sending the gas to the pneumatic actuator through a needle valve, and a universal operation hand operated valve configured to send the gas to the solenoid valve or to the partial stroke test device.

The method includes providing a gas to a control system along a gas flow path, operating a solenoid valve from a closed position to an open position to allow the gas to flow along the gas flow path to a pneumatic actuator having a spring that is compressible and connected to the isolation valve, sending a signal from a computer to a partial stroke test device to perform partial stroking of the isolation valve by sending the gas to the pneumatic actuator, and sending the gas to the solenoid valve or to the partial stroke test device using a universal operation hand operated valve.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
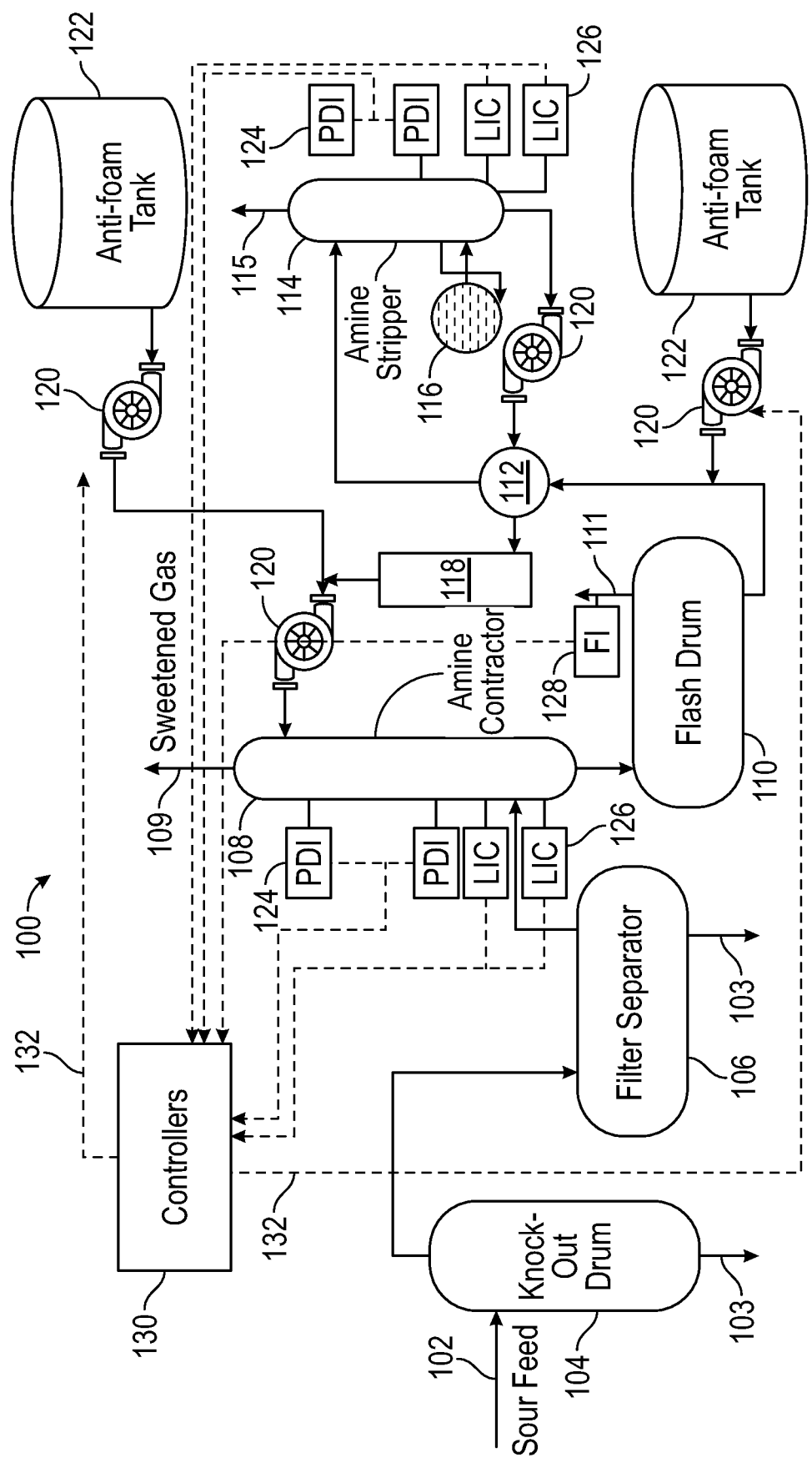
FIG. 1 illustrates an example gas processing system in accordance with one or more embodiments.

FIG. 1 illustrates an example gas processing system. Specifically, FIG. 1 depicts the flow of fluid through an exemplary gas processing plant (100). As shown in FIG. 1, an incoming contaminated fluid (102) is sent to a gas processing plant (100) via a pipeline. The incoming contaminated fluid (102) may be called the "sour feed." The incoming contaminated fluid (102) may be multi-phase and be composed of a variety of solid, liquid, and gaseous constituents. For example, the incoming contaminated fluid (102) may contain solid particulates like sand, mineral precipitates such as pipe scale, and corroded pipe, liquid such as water, and gases like carbon dioxide ($CO_2$) and hydrogen sulfide ($H_2S$). In particular, $H_2S$, in the presence of water, is highly corrosive and should be removed to prevent a leak in the pipeline. Additionally, the incoming contaminated fluid (102) may contain liquid and gas forms of various hydrocarbons.

In the example, gas processing plant (100) of FIG. 1, the incoming contaminated fluid (102), or sour feed, is processed by a knock-out drum (104). The knock-out drum (104) performs bulk separation of gas and liquid. Liquid, separated from the incoming contaminated fluid (102), exits the knock-out drum (104) through a liquid exit (103).

From the knock-out drum (104), the bulk gas is processed by a filter separator (106). A filter separator (106) removes impurities such as mineral precipitates (e.g., pipe scale), water, liquid hydrocarbons, and iron sulfide from the fluid. A filter separator (106) uses filter elements, such as a replaceable sock or a coalescing filter, rather than mechanical components to separate out contaminants. According to the application, a filter separator (106) may be composed of 1 or 2 stages and may operate at high or low pressure. Again, the unwanted portions of the incoming contaminated fluid (102) exit the filter separator (106) through an exit (103).

After the filter separator (106), the incoming contaminated fluid (102) has been reduced to a gaseous stream. The gaseous stream undergoes another purifying sub-process through an amine contactor (108). An amine contactor (108) absorbs carbon dioxide (CO2) and/or hydrogen sulfide (H2S) contaminants from the gaseous stream. In general, an amine contactor (108), receives the partially processed incoming contaminated fluid (102), or gaseous stream, and a "lean" amine liquid. Common amines are diethanolamine (DEA), monoethanolamine (MEA), methyldiethanolamine (MDEA), diisopropanolamine (DIPA), and aminoethoxyethanol (Diglycolamine) (DGA).

The contact between the gaseous stream and the lean amine liquid drives the absorption of CO2 and/or H2S into the amine liquid from the gaseous stream. As a result, decontaminated gas (109), also known as "sweetened gas," may exit the amine contactor (108). The decontaminated gas (109) should be checked to make sure required specifications are met. If the decontaminated gas (109) does not meet the required specifications, this is indicative that control parameters within the gas processing plant (100) require adjustment. The sub-processes of the knock-out drum (104), filter separator (106), and amine contactor (108) effectively transform the incoming contaminated fluid (102) to a decontaminated gas (109) and complete the objective of the gas processing plant (100). However, additional processes are required to maintain the gas processing plant (100) in an operational state. For example, the liquid amine that has absorbed the unwanted CO2 and H2S, which is called "rich" amine, is sent to an amine stripper for removal of contaminants and re-conditioning.

As shown in FIG. 1, the contaminated amine is first sent to a flash drum (110). This sub-process consists of throttling the contaminated amines causing a pressure drop such that vapors are formed. The vapors exit the flash drum, where the vapors undergo further processing, such as being passed to an oxidizer. These steps have been omitted from FIG. 1, for brevity.

The remaining liquid contaminated amines enter a heat exchanger (112). The heat exchanger (112) recovers heat from the decontaminated amine leaving the amine stripper (114), which is described below. Consequently, the heat exchanger (112) heats the contaminated amine before entering the amine stripper (114).

The amine stripper (114) serves to remove the absorbed contaminants, such as H2S and CO2, from the amine solution so that it can be used again in the amine contactor (108). The amine stripper (114) is equipped with a reboiler (116). The amine stripper (114) contains a tray column consisting of a stripping section and a water wash section at the top. The reboiler (116) takes the amine solution located at the bottom of the amine stripper (114) and partially boils the amine solution. Steam (hot, gaseous water) is typically used as the heat source in the reboiler (116). Steam, typically sourced from the reboiler (116), flows up the column in the amine stripper (114) and contacts the contaminated amine solution flowing down within the column. As the contaminated amine contacts the steam, the contaminated amine is heated up and the contaminants are stripped out of the rich amine solution and flow to the stripping section of the column.

The stripped gases, commonly referred to as amine acid gas, leaves the amine stripper through a stripped gas exit (115). The stripped gases undergo further processing, such as condensing out the water and passing the remaining acid gases to a sulfur recovery process, but these processes are not shown in FIG. 1, for brevity.

The decontaminated amine solution, leaving the bottom of the amine stripper (114), contains very low quantities of acid gas (such as H2S). This decontaminated amine solution may be recycled in a lean amine storage tank (not shown) and/or returned to the amine contactor (108). As shown in FIG. 1, the decontaminated amine solution leaving the amine stripper (114) is passed through the heat exchanger (112), to transfer heat to the contaminated amine solution leaving the flash drum (110). After passing through the heat exchanger (112), the decontaminated amine solution may be further cooled in a cooler (118) before being returned to the amine contactor (108).

The transport of the various fluids of the gas processing plant of FIG. 1 is facilitated by a plurality of pumps and/or compressors (120) disposed throughout the system. The type of pump or compressor (120), and the location may be altered and arranged according to plant-specific needs.

As noted above, it is emphasized that a gas processing plant (100) may implement different sub-processes and mechanisms for achieving adequate gas processing. Some sub-processes may include compression, stabilization, and dehydration. The gas processing plant (100) may also encompass the treatment of removed water for disposal through sub-processes such as filtration and deionization. Additionally, elements for heating and cooling may be provided to prevent the formation of hydrates, and mitigate corrosion and aid in dehydration, respectively. With respect to decontaminating the incoming contaminated fluid (102), other chemical and physical washes may be used without departing from the scope of this disclosure.

As shown in FIG. 1, the sub-processes may be monitored and controlled by a plurality of sensors and controllers. As an example, the amine contactor (108) and amine stripper (114) are both equipped with pressure differential indicators (PDI) (124) and level indicators (LIC) (126) in FIG. 1. Additionally, FIG. 1 depicts a flow indicator (FI) (128) connected to the exit of the flashed gases exiting the flash drum (110). The PDIs, LICs, and FIs, which are sensors, may send information regarding the pressure difference measured across sub-processes, the quantity and level of fluids present, and the flow rate of fluids, respectively, to a plurality of controllers (130). Flow indicators (FIs) disposed throughout the gas processing plant (100) may be multiphase flow indicators.

The plurality of controllers (130) may herein be referred to as "controllers" or "controller" where appropriate. Controllers (130) may be distributed, local to the sub-processes and associated device, global, connected, etc. Controllers (130) may include a programmable logic controller (PLC), a distributed control system (DCS), a supervisory control and data acquisition (SCADA), and/or a remote terminal unit (RTU).

For example, a programmable logic controller (PLC) may control valve states, fluid levels, pipe pressures, warning alarms, and/or pressure releases throughout a gas processing plant (100). In particular, a programmable logic controller (PLC) may be a ruggedized computer system with functionality to withstand vibrations, extreme temperatures, wet conditions, and/or dusty conditions, for example, around a refinery.

A distributed control system may be a computer system for managing various processes at a gas processing plant (100) using multiple control loops. As such, a distributed control system may include various autonomous controllers (130) (such as remote terminal units) positioned at different locations throughout the plant to manage operations and monitor processes. Likewise, a distributed control system may include no single centralized computer for managing control loops and other operations.

On the other hand, a SCADA system may include a control system that includes functionality for enabling monitoring and issuing of process commands through local control at a gas processing plant (100) as well as remote control outside the plant. With respect to an RTU, an RTU may include hardware and/or software, such as a microprocessor, that connects sensors and/or actuators using network connections to perform various processes in the automation system. Likewise, a control system may be coupled to one or more gas processing plant (100) devices.

FIG. 1 also depicts anti-foam tanks (122) which contain an anti-foaming agent that may be injected, by use of a pump/compressor (120) and a controller (130), into different parts of the gas processing system as indicated by the dashed line (132). The anti-foam tanks (122) and injection of an anti-foaming agent into the sub-processes of the gas processing plant (100) may be necessary because a frequent problem in gas processing plants (100) is foaming. This problem is usually the result of improper operating conditions in the sub-processes in conjunction with the presence of contaminants. A common mitigative action is to inject an anti-foaming agent into the system.

Foam is the result of a mechanical incorporation of a gas into a liquid, in a multi-phase fluid, where the liquid surrounds a volume of gas creating a bubble. The liquid entrained between the gas bubbles begins to drain as the bubbles rise past the bulk gas/liquid interface. If bubbles are being formed at a faster rate than the existing ones are breaking, and faster than the entrained liquid is draining, the bubbles will accumulate as foam.

Anti-foaming agents for gas processing plants (100) are usually non-ionic surfactants that act to lower the surface tension of the gas/liquid interface. Lowering the surface tension at this interface aids in draining liquid entrapped between bubbles present in a multi-phase fluid. The anti-foaming agent is intended to facilitate gas and liquid disengagement by weakening the cell structure of the bubbles.

Foaming throughout the gas processing plant (100) may be detected using the embedded sensors (124, 126, 128, and others not shown) in the sub-processes. For example, some indicators of foaming may include, but are not limited to: a sudden increase in differential pressure in the amine contactor (108) or amine stripper (114); an irregular or drastic drop in liquid levels in the amine contactor (108) or amine stripper (114); and/or a precipitous increase in the flow of flashed gases. Depending on the location and suspected cause of foaming, various foam reduction procedures may be taken such as, but not limited to: adjusting the pressure of the flash drum (110); adjusting the temperature of the lean amine solution entering the amine contactor (108); adjusting the amine solution.

Emergency isolation valves are safety valves that are used to shut off flow of a fluid in an emergency. For example, in the gas processing plant (100) outlined in FIG. 1, the contaminated fluid (102) may be dangerous to people and the environment. As such, if an emergency were to occur, such as a fire, an earthquake, a leak, etc., it is important that the supply of contaminated fluid (102) entering the gas processing plant (100) is stopped or contained.

Furthermore, it is important that the supply can be stopped remotely. The isolation valve should only close when required by emergency or abnormal process conditions. Thus, the isolation valve should not unnecessary close due to failure of accessories or test devices. Closure due to failure of auxiliary devices will unnecessarily interrupt operation or stop an entire unit within the gas processing plant (100).

As such, the present disclosure outlines a control system (200) for an isolation valve (202) that enables the isolation valve (202) to be operated remotely and allows for portions of the control system (200), such as the auxiliary devices, to be isolated from one another without limiting the functionality of the isolation valve (202). In accordance with one or more embodiments, the systems and methods outlined in the present disclosures prevents unnecessary closure of the isolation valve.

Figure 2:
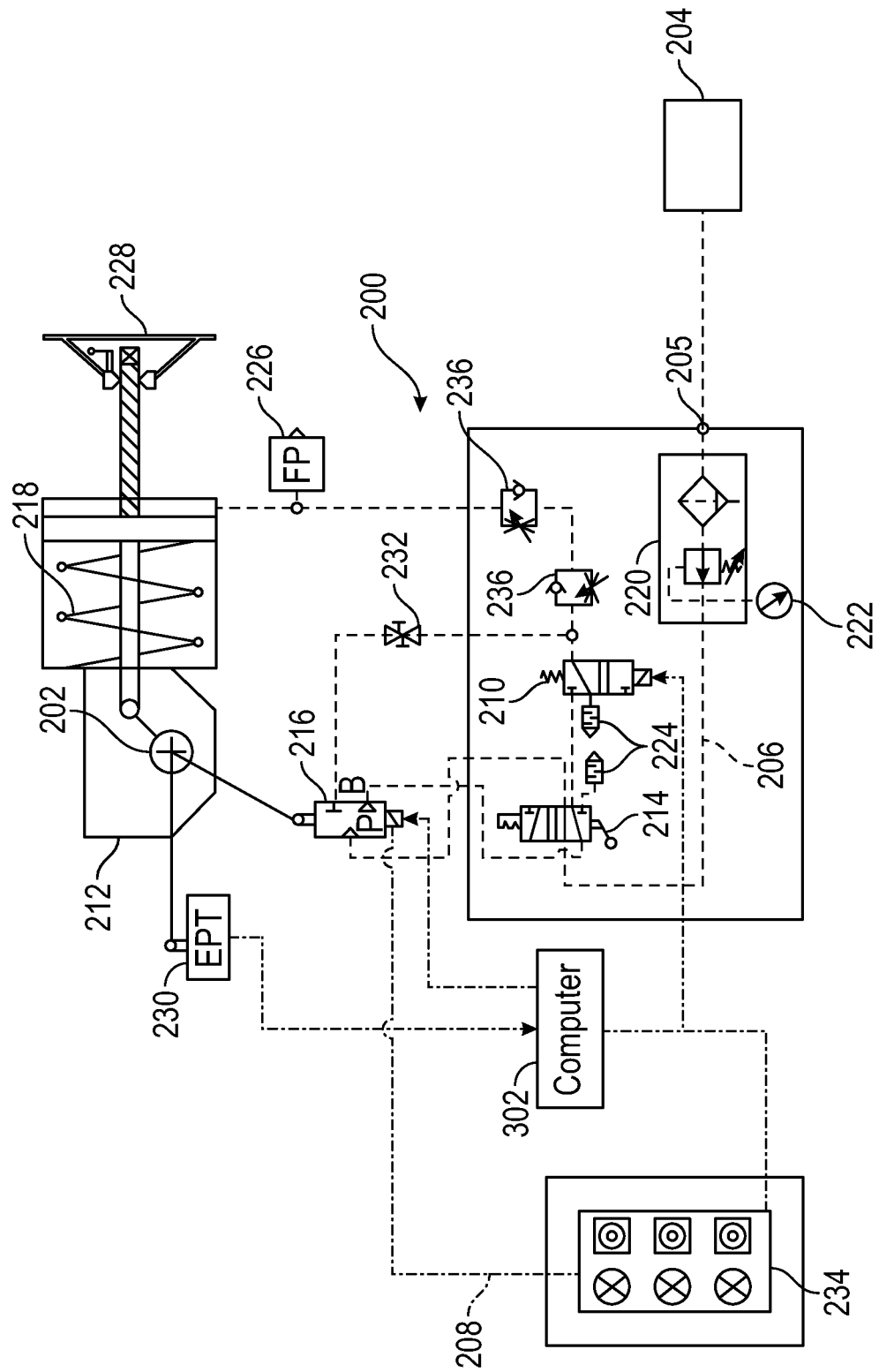
FIG. 2 shows a control system for an isolation valve in accordance with one or more embodiments.

FIG. 2 shows a control system (200) for an isolation valve (202) in accordance with one or more embodiments. The control system (200) and the isolation valve (202) may be used in a gas processing plant (100) as outlined in FIG. 1. However, usage of the control system (200) and the isolation valve (202) should not be limited to usage in a gas processing plant (100) and may be used in any operation that may require stoppage of fluids from flowing. The isolation valve (202) may be a pneumatically operated emergency isolation valve (202). That is, the isolation valve (202) is operated using a compressed gas. Herein the gas may be any type of gas known in the art. In particular, the gas may be an inert gas such as air. FIG. 2 shows a gas supply (204), containing the gas, connected to the control system (200) via a gas supply line (not shown).

FIG. 2 shows two different dashed lines. The first dashed line represents the gas flow path (206). The second dashed line represents electrical communications (208). Although the gas supply line is not explicitly shown in FIG. 2, the gas supply line will exist at least in part along the shown gas flow path (206). The control system (200) may include a physical control system and a software control system that work together to open and close the isolation valve (202).

The physical control system includes a solenoid valve (210), a pneumatic actuator (212), a universal operation hand operated valve (UOHOV) (214), and a partial stroke test device (PSTD) (216). In accordance with one or more embodiments, the solenoid valve (210) is a 3/2 NC direct acting solenoid valve (210), the pneumatic actuator (212) is a single acting spring (218) return pneumatic actuator (212), and the UOHOV (214) is a 5/2 UOHOV (214). The solenoid valve (210) opens and closes to allow the gas to access the pneumatic actuator (212) along the gas flow path (206).

FIG. 2 shows the solenoid valve (210) in the open position. The solenoid valve (210) may be opened or closed based on a signal sent from a computer (302) in accordance with one or more embodiments. The computer (302) is further outlined in FIG. 3 below. Further, the computer (302) may be any of the controllers (130) outlined in FIG. 1, be used in conjunction with the controllers (130), or be a part of the controllers (130) without departing from the scope of the disclosure herein. Further, there may be more than one computer (302).

When the solenoid valve (210) is open, gas is permitted to flow to the pneumatic actuator (212). The pneumatic actuator (212) uses the single acting spring (218) to keep the isolation valve (202) in a closed position. That is, the spring (218) of the pneumatic actuator (212), in its natural position, keeps the isolation valve (202) in the closed position. The pneumatic actuator (212) uses the flow of gas to compress the spring (218) and open the isolation valve (202). When the solenoid valve (210) is closed gas is unable to go to the pneumatic actuator (212) from the solenoid valve (210).

The gas enters the control system (200) via a gas inlet (205) from the gas supply (204). The gas supply (204) may be any supply of gas known in the art. For example, the gas supply (204) may be the atmosphere providing air as the gas, or the gas supply (204) may be a tank containing a specific type of gas. In accordance with one or more embodiments, the gas supply (204) may provide gas in a compressed state. For example, the gas from the gas supply (204) may be directed through a compressor, or the tank of gas may hold the gas in a compressed state.

From the gas inlet (205), the gas enters a filter regulator (220). In accordance with one or more embodiments, the filter regulator (220) acts to control the speed and precision of the flow of gas and acts to filter various solid and liquid particles from the gas. The filter regulator (220) may have a pressure gauge (222), as shown in FIG. 2. The pressure gauge (222) may be any type of pressure gauge known in the art, such as a bourdon tube pressure gauge, a diaphragm pressure gauge, a capsule pressure gauge, an absolute pressure gauge, etc. The pressure gauge (222) may measure the pressure of the gas in the filter regulator (220).

The gas moves from the filter regulator (220) to the UOHOV (214). The UOHOV (214) has an open position and a closed position. FIG. 2 shows the UOHOV (214) in the open position. With the UOHOV (214) in the open position, the gas flows to the PSTD (216). The PSTD (216) provides the functionality for partial stroking of the isolation valve (202). Partial stroking of the isolation valve (202) may be performed routinely to endure mechanical healthiness of the isolation valve (202).

The PSTD (216) may also provide indication of gas supply (204) pressure and pneumatic actuator (212) pressure. The pressure indications may be used by logic to provide status alarms and ensure safe operation of the isolation valve (202). When the PSTD (216) is not performing a partial stroking test, the gas flows from the PSTD (216) back through the UOHOV (214) to the solenoid valve (210). With the UOHOV (214) in the closed position, the gas flows directly from the UOHOV (214) to the solenoid valve (210). In accordance with one or more embodiments, the UOHOV (214) may always be in the closed position until a partial stroking test is required. When a partial stroking test is required, the UOHOV (214) will be opened and the test may be performed using a signal sent by the computer (302) to the PSTD (216).

The gas may also pass through one or more dust excluders (224) to filter out smaller particles of solids and liquids that were not filtered out or missed by the filter regulator (220). In accordance with one or more embodiments, the UOHOV (214) and the solenoid valve (210) each have a dust excluder (224) to ensure that the gas does not damage the UOHOV (214) and the solenoid valve (210).

From the solenoid valve (210), the gas flows to the pneumatic actuator (212) to open/keep open the isolation valve (202). The pneumatic actuator (212) opens or keeps open the isolation valve (202) by using the gas to compress the spring (218) in the pneumatic actuator (212). Specifically, the gas flows from the solenoid valve (210) through one or more flow regulators (236). The flow regulators (236) control the pressure of the gas flowing from the solenoid valve (210) to the pneumatic actuator (212). The level of pressure supplied to the pneumatic actuator (212) determines the speed of isolation valve (202) movement. Further, the flow regulators (236) prevent flow of gas in the opposing direction.

A fusible plug (226) may be located between the flow regulators (236) and the pneumatic actuator (212) so that, in the case of a fire, the fusible plug (226) may melt and block the gas flow path (206) so that the gas is no longer able to flow to the pneumatic actuator (212). Thus, allowing the spring (218) to close the isolation valve (202). To open the isolation valve (202), an initial supply of gas should be pumped to the pneumatic actuator (212). To keep the isolation valve (202) open, a constant pressure should be applied on the gas to the pneumatic actuator (212).

The control system (200) further includes a manual override (228) connected to the pneumatic actuator (212). The manual override (228) may allow for opening or closing the isolation valve (202) manually. The manual override (228) disconnects the pneumatic actuator (212) from the isolation valve (202) to allow opening or closing of the isolation valve (202) manually.

The control system (200) further includes an electric position transmitter (EPT) (230) in accordance with one or more embodiments. The EPT (230) provides continuous monitoring of the real-time opening/closing of the isolation valve (202). The EPT (230) may be connected to the computer (302). The computer (302) may be viewed by personnel to ensure operation of the isolation valve (202) and monitor the partial stroke tests when they are being performed on the isolation valve (202).

The PSTD (216) may perform partial stroking of the isolation valve (202) when a signal is sent to the PSTD (216). The signal may be sent from the computer (302) or local control panel in accordance with one or more embodiments. When the signal is received by the PSTD (216), the PSTD (216) may limit the amount of gas going to the pneumatic actuator (212) which allows for partial stroking of the isolation valve (202). That is, with a limited amount of gas flowing to the pneumatic actuator (212), the spring (218) in the pneumatic actuator (212) is able to partially decompress and partially close the isolation valve (202).

When the UOHOV (214) is in the closed position, the PSTD (216) is able to be bypassed and the gas may flow from the UOHOV (214) directly to the solenoid valve (210). The needle valve (232) may also be closed to further isolate the PSTD (216) from the control system (200). With the PSTD (216) isolated from the control system (200), the functionality of the isolation valve (202) should not be affected by failure or limitations of the PSTD (216). Furthermore, isolation of the PSTD (216) from the control system (200) allows for maintenance to be made to the PSTD (216) without affecting the functionality of the isolation valve (202).

FIG. 2 further shows an electric control panel (234) that is in electrical communication (208) with the EPT (230), the PSTD (216), and the solenoid valve (210) in accordance with one or more embodiments. The electric control panel (234) may also be integrated with the computer (302) as shown in FIG. 2. In accordance with one or more embodiments, the electric control panel (234) and the computer (302) are the DCS as outlined in FIG. 1. The isolation valve (202) may be closed from the DCS or physical field buttons whenever required. The command to close the isolation valve (202) should be available to allow operators to close the isolation valve (202) whenever required.

In accordance with one or more embodiments, the isolation valve (202) may only be opened when the DCS activates the permissive signal, and a field operator pushes an open button from a local/physical panel. This setup ensures that all process conditions are cleared from the DCS and field before opening the isolation valve (202).

In accordance with one or more embodiments, the DCS may not activate the permissive signal if the UOHOV (214)

is open. This configuration prevents the isolation valve (202) from being opened directly from DCS. The UOHOV (214) open status may be visually displayed on the process mimic for immediate determination of the status of the hand operated valve. Historical data may show when the UOHOV (214) is opened.

In accordance with one or more embodiments, the DCS may not be allowed by logic to activate the permissive signal when there is PSTD (216) failure alarm. This configuration prevents the isolation valve (202) from being opened directly from the DCS. PSTD (216) failed status may be visually displayed on the process mimic for immediate determination of the status of the positioner. Historical data will show when the positioner failed.

A solenoid valve (210) failure alarm may be configured to detect full or partial closure of the solenoid valve (210) while the command is active by monitoring the pneumatic actuator (212) pressure. The alarm will detect impending failure due to a solenoid valve (210) defect, damaged cable, or loose connection. This alarm alerts the operators to implement immediate required checks on the solenoid valve (210) or take immediate action to prevent unwanted operational consequences. On severe solenoid valve (210) or connection failure that causes the isolation valve (202) to move to less than 50% open, the valve command may be deactivated.

Figure 3:
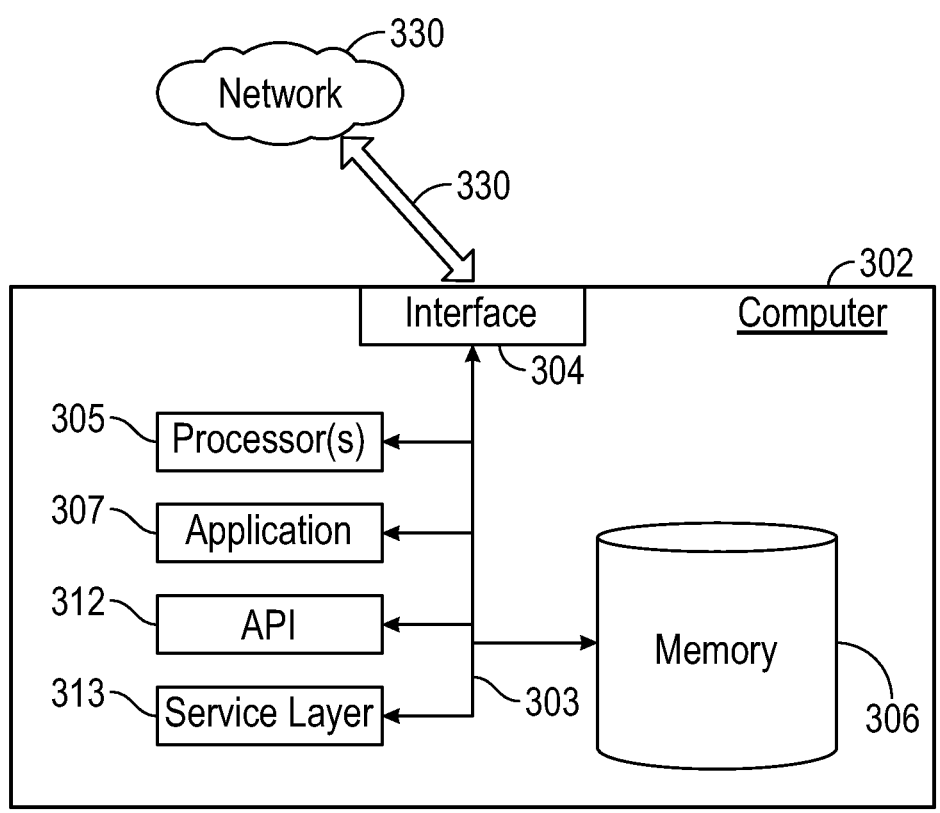
FIG. 3 shows a computer system in accordance with one or more embodiments.

FIG. 3 shows a computer (302) system in accordance with one or more embodiments. Specifically, FIG. 3 shows a block diagram of a computer (302) system used to provide computational functionalities associated with described algorithms, methods, functions, processes, flows, and procedures as described in the instant disclosure, according to an implementation. The illustrated computer (302) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (302) may include a computer that includes an input device, such as a keypad, keyboard, touch screen, or other device that can accept user information, and an output device that conveys information associated with the operation of the computer (302), including digital data, visual, or audio information (or a combination of information), or a GUI.

The computer (302) can serve in a role as a client, network component, a server, a database or other persistency, or any other component (or a combination of roles) of a computer system for performing the subject matter described in the instant disclosure. The illustrated computer (302) is communicably coupled with a network (330). In some implementations, one or more components of the computer (302) may be configured to operate within environments, including cloud-computing-based, local, global, or other environment (or a combination of environments).

At a high level, the computer (302) is an electronic computing device operable to receive, transmit, process, store, or manage data and information associated with the described subject matter. According to some implementations, the computer (302) may also include or be communicably coupled with an application server, e-mail server, web server, caching server, streaming data server, business intelligence (BI) server, or other server (or a combination of servers).

The computer (302) can receive requests over network (330) from a client application (for example, executing on another computer (302)) and responding to the received requests by processing the said requests in an appropriate software application. In addition, requests may also be sent to the computer (302) from internal users (for example, from a command console or by other appropriate access method), external or third-parties, other automated applications, as well as any other appropriate entities, individuals, systems, or computers.

Each of the components of the computer (302) can communicate using a system bus (303). In some implementations, any or all of the components of the computer (302), both hardware or software (or a combination of hardware and software), may interface with each other or the interface (304) (or a combination of both) over the system bus (303) using an application programming interface (API) (312) or a service layer (313) (or a combination of the API (312) and service layer (313). The API (312) may include specifications for routines, data structures, and object classes. The API (312) may be either computer-language independent or dependent and refer to a complete interface, a single function, or even a set of APIs. The service layer (313) provides software services to the computer (302) or other components (whether or not illustrated) that are communicably coupled to the computer (302).

The functionality of the computer (302) may be accessible for all service consumers using this service layer. Software services, such as those provided by the service layer (313), provide reusable, defined business functionalities through a defined interface. For example, the interface may be software written in JAVA, C++, or other suitable language providing data in extensible markup language (XML) format or other suitable format. While illustrated as an integrated component of the computer (302), alternative implementations may illustrate the API (312) or the service layer (313) as stand-alone components in relation to other components of the computer (302) or other components (whether or not illustrated) that are communicably coupled to the computer (302). Moreover, any or all parts of the API (312) or the service layer (313) may be implemented as child or sub-modules of another software module, enterprise application, or hardware module without departing from the scope of this disclosure.

The computer (302) includes an interface (304). Although illustrated as a single interface (304) in FIG. 3, two or more interfaces (304) may be used according to particular needs, desires, or particular implementations of the computer (302). The interface (304) is used by the computer (302) for communicating with other systems in a distributed environment that are connected to the network (330). Generally, the interface (304) includes logic encoded in software or hardware (or a combination of software and hardware) and operable to communicate with the network (330). More specifically, the interface (304) may include software supporting one or more communication protocols associated with communications such that the network (330) or interface's hardware is operable to communicate physical signals within and outside of the illustrated computer (302).

The computer (302) includes at least one computer processor (305). Although illustrated as a single computer processor (305) in FIG. 3, two or more processors may be used according to particular needs, desires, or particular implementations of the computer (302). Generally, the computer processor (305) executes instructions and manipulates data to perform the operations of the computer (302) and any algorithms, methods, functions, processes, flows, and procedures as described in the instant disclosure.

The computer (302) also includes a non-transitory computer (302) readable medium, or a memory (306), that holds data for the computer (302) or other components (or a combination of both) that can be connected to the network (330). For example, memory (306) can be a database storing data consistent with this disclosure. Although illustrated as a single memory (306) in FIG. 3, two or more memories may be used according to particular needs, desires, or particular implementations of the computer (302) and the described functionality. While memory (306) is illustrated as an integral component of the computer (302), in alternative implementations, memory (306) can be external to the computer (302).

The application (307) is an algorithmic software engine providing functionality according to particular needs, desires, or particular implementations of the computer (302), particularly with respect to functionality described in this disclosure. For example, application (307) can serve as one or more components, modules, applications, etc. Further, although illustrated as a single application (307), the application (307) may be implemented as multiple applications (307) on the computer (302). In addition, although illustrated as integral to the computer (302), in alternative implementations, the application (307) can be external to the computer (302).

There may be any number of computers (302) associated with, or external to, a computer system containing computer (302), each computer (302) communicating over network (330). Further, the term "client," "user," and other appropriate terminology may be used interchangeably as appropriate without departing from the scope of this disclosure. Moreover, this disclosure contemplates that many users may use one computer (302), or that one user may use multiple computers (302).

Figure 4:
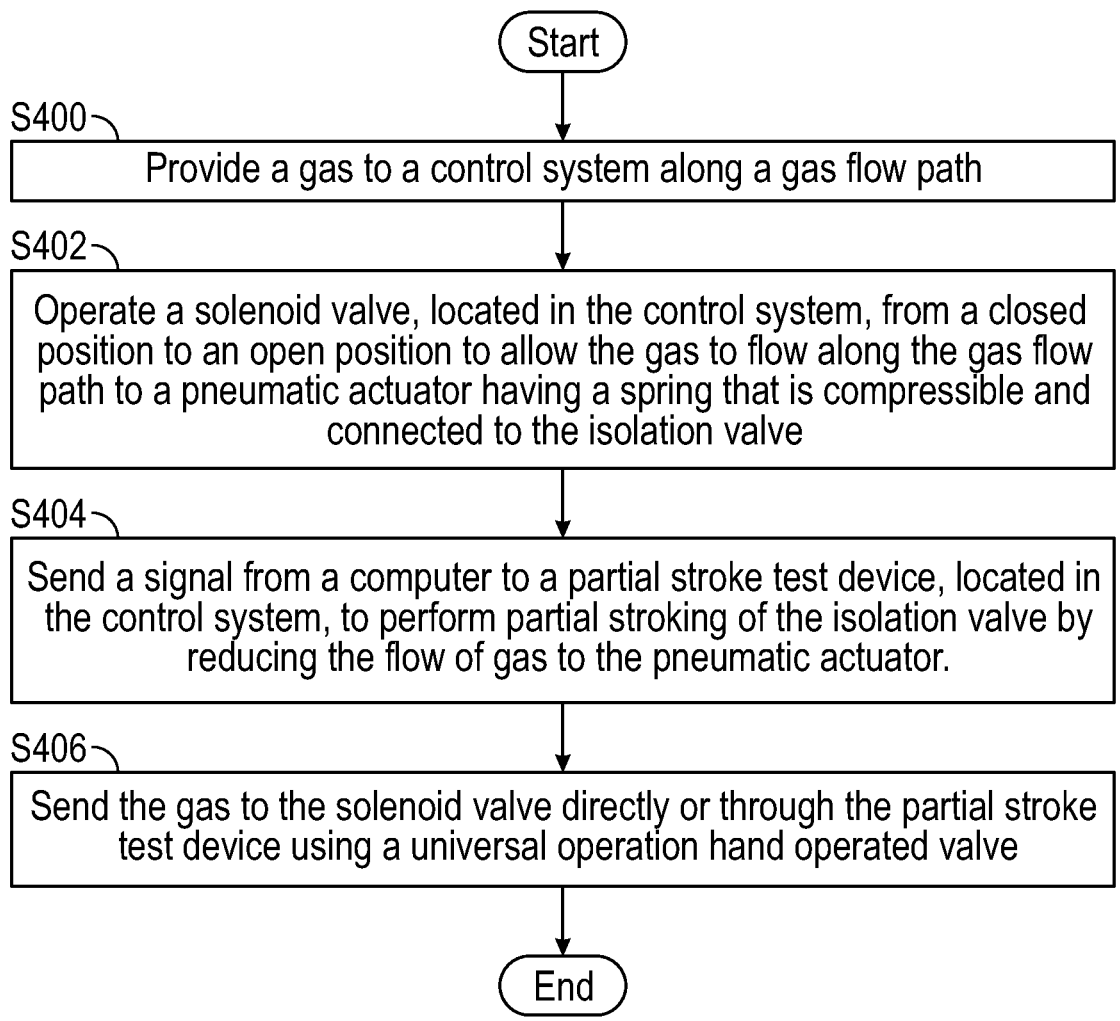
FIG. 4 shows a flowchart in accordance with one or more embodiments.

FIG. 4 shows a flowchart in accordance with one or more embodiments. The flowchart outlines a method for operating an isolation valve. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 400, a gas is provided to a control system (200) along a gas flow path (206). In accordance with one or more embodiments, the gas is sent from a gas supply (204) to the control system (200) through a gas inlet (205). In accordance with one or more embodiments, the gas flows from the gas inlet (205) to a filter regulator (220). The filter regulator (220) filters particles, such as solids or fluids, from the gas. In further embodiments, the filter regulator (220) has a pressure gauge (222) that measures a pressure of the gas.

The gas flows from the filter regulator (220) to a UOHOV (214). The UOHOV (214) has an open position and a closed position. When the UOHOV (214) is open, the gas is sent to a PSTD (216). When the UOHOV is closed, the gas is sent directly to a solenoid valve (210).

In step 402, the solenoid valve (210), located in the control system (200), is operated from a closed position to an open position to allow the gas to flow along the gas flow path (206) to a pneumatic actuator (212) having a spring (218) that is compressible and connected to the isolation valve (202). In accordance with one or more embodiments, the solenoid valve (210) is operated using a signal sent to the solenoid valve (210) from a computer (302). The gas compresses the spring (218) to open the isolation valve (202). The solenoid valve (210) may include a dust excluder (224) that filters particles from the gas. Specifically, the dust excluder (224) may filter smaller particles that were missed by the filter regulator (220).

In step 404, a signal is sent from the computer (302) to the PSTD (216) located in the control system (200) to perform partial stroking of the isolation valve (202) by reducing the flow of gas to the pneumatic actuator (212). The gas sent to the pneumatic actuator (212) from the PSTD (216) may only be enough to partially keep the isolation valve (202) open, thus allowing for partial stroking of the isolation valve (202).

In step 406, the gas is sent to the solenoid valve (210) directly or through the PSTD (216) using a UOHOV (214). The UOHOV (214) may also include a dust excluder (224) that filters particles from the gas. When the gas is sent from the UOHOV (214) directly to the solenoid valve (210), the PSTD (216) is able to be bypassed and isolated from the remainder of the control system (200). When the gas is sent from the UOHOV (214) to the PSTD (216), the PSTD (216) may reduce the pressure of the gas to the pneumatic actuator (212) to perform a partial stroke test.

In accordance with one or more embodiments, the partial stroke test includes partially closing the pneumatic actuator (212) and returning the pneumatic actuator (212) to a fully open position. In further embodiments, the PSTD (216) has an internal valve to control the output pressure. The PSTD (216) reduces the pressure of the gas to the pneumatic actuator (212) by partially closing its internal valve. The internal valve will return to a fully open position after the partial stoke test. The needle valve (232), together with the UOHOV (214), is used to isolate the PSTD (216) from the control system (200).

From the solenoid valve (210), the gas is sent to one or more flow regulators (236) that regulate a flow of the gas along the gas flow path (206). In accordance with one or more embodiments, the flow regulators (236) ensure the gas is at the correct pressure to open or partially open the isolation valve (202) at the required speed. When the solenoid valve (210) is closed, the gas is prevented from flowing along the gas flow path (206) to the pneumatic actuator (212).

In further embodiments, a fusible plug (226) may be located between the flow regulators (236) and the pneumatic actuator (212). In emergencies, such as in a fire, the heat from the fire may melt the fusible plug (226) and prevent the gas from flowing along the gas flow path (206) to the pneumatic actuator (212). Further, the pneumatic actuator (212) may have a manual override (228) that is used to manually override the pneumatic actuator (212).

An EPT (230) may be connected to the isolation valve (202). The EPT (230) monitors the real-time position of the isolation valve (202) and sends the position of the isolation valve (202) to the computer (302). The computer (302), using logic, or a user of the computer (302) may observe the position of the isolation valve (202) during the partial stroke tests to determine maintenance of the isolation valve (202) or the control system (200).

In one or more embodiments, any of the following features may be included together in combination with any other of the following features. The system may comprise a computer configured to move the pneumatic actuator to an open or closed position by automatic or manual manipulation of signal to the electric solenoid valve. The system may comprise the PSTD configured to measure the gas pressure sent to the actuator and send the measurement to the computer. The system may comprise a needle valve configured to isolate the partial stroke test device from gas flow to pneumatic actuator. The system may comprise the fusible plug configured to cut gas supply to the pneumatic actuator in case of overtemperature in case of fire. The system may comprise the flow regulator configured to control the speed of movement of the pneumatic actuator. The system may comprise the filter regulator configured to provide clean gas supply with constant pressure to the system.

In one or more embodiments, any of the following features may be included together in combination with any other of the following features. The method may comprise displaying health status of partial stroke test device status. The method may comprise displaying actual position of universal operation hand valve. The method may comprise displaying health status of solenoid valve. The method may comprise controlling the access to operation of isolation valve without satisfying signal requirements for safe operation. The method may comprise performing maintenance checks on partial stroke test device without affecting functionality of the system. The method may comprise preventing unintended closure of the isolation valve in case of position transmitter failure. The method may comprise preventing unintended closure of the isolation valve when the position is still above tolerable value in case of intermittent loss of electrical supply to the electric solenoid valve.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A control system for an isolation valve, the control system comprising:
   a pneumatic actuator having a spring that is compressible by a gas and connected to the isolation valve, wherein the gas is supplied to the pneumatic actuator along a gas flow path;
   a solenoid valve operable between an open position and a closed position, wherein the open position permits the gas to flow along the gas flow path to the pneumatic actuator;
   a partial stroke test device configured to perform partial stroking of the isolation valve upon reception of a signal from a computer by sending the gas to the pneumatic actuator through a needle valve; and
   a universal operation hand operated valve configured to send the gas to the solenoid valve or to the partial stroke test device.

2. The control system of claim 1, wherein the solenoid valve is operable between the open position and the closed position using a signal sent from the computer.

3. The control system of claim 1, wherein closure of the solenoid valve prevents the gas from flowing along the gas flow path to the pneumatic actuator.

4. The control system of claim 1, further comprising an electric position transmitter connected to the isolation valve and in electronic communication with the computer.

5. The control system of claim 1, further comprising a fusible plug located between the solenoid valve and the pneumatic actuator.

6. The control system of claim 1, further comprising a flow regulator located between the solenoid valve and the pneumatic actuator.

7. The control system of claim 1, further comprising a filter regulator located along the gas flow path before the universal operation hand operated valve.

8. The control system of claim 7, wherein the filter regulator further comprises a pressure gauge.

9. The control system of claim 1, wherein the universal operation hand operated valve and the solenoid valve each comprise a dust excluder.

10. The control system of claim 1, wherein the pneumatic actuator further comprises a manual override.

11. A method for operating an isolation valve, the method comprising:
   providing a gas to a control system along a gas flow path;
   operating a solenoid valve from a closed position to an open position to allow the gas to flow along the gas flow path to a pneumatic actuator having a spring that is compressible and connected to the isolation valve;
   sending a signal from a computer to a partial stroke test device to perform partial stroking of the isolation valve by sending the gas to the pneumatic actuator; and
   sending the gas to the solenoid valve or to the partial stroke test device using a universal operation hand operated valve; and further comprising preventing the gas from flowing along the gas flow path to the pneumatic actuator by melting a fusible plug.

12. The method of claim 11, wherein operating the solenoid valve further comprises sending a signal to the solenoid valve from the computer.

13. The method of claim 11, further comprising closing the solenoid valve to prevent the gas from flowing along the gas flow path to the pneumatic actuator.

14. The method of claim 11, further comprising sending a position of the isolation valve to the computer using an electric position transmitter.

15. The method of claim 11, further comprising regulating a flow of the gas along the gas flow path using a flow regulator.

16. The method of claim 11, further comprising filtering particles from the gas using a filter regulator.

17. The method of claim 16, further comprising measuring a pressure of the gas from the filter regulator using a pressure gauge.

18. The method of claim 11, further comprising filtering particles from the gas using a dust excluder.

19. The method of claim 11, further comprising manually overriding the pneumatic actuator using a manual override.

* * * * *